United States Patent Office 3,203,825
Patented Aug. 31, 1965

3,203,825
NITROGEN-CONTAINING SILICON POLYMER, METHOD OF COATING THEREWITH AND COATED PRODUCT
George D. Stevens, Marinette, Wis., assignor to The Ansul Company, a corporation of Wisconsin
No Drawing. Filed Mar. 24, 1960, Ser. No. 17,253
10 Claims. (Cl. 117—62.1)

This invention relates to resinous compositions comprising siloxanes and more particularly relates to the product of the reaction of a partially hydrolyzed methyl hydrogen poylsiloxane and an alkyl diamine.

It is well known in the art that such methyl hydrogen polysiloxanes which normally are quite fluid oils can be polymerized with heat alone, with organo metallic catalysts such as zinc octoate or lead naphthenate, with basic materials such as ethanolamine and with materials having a high surface area such as activated alumina or activated silica gel. However, when used according to the prior art, materials of this type act as catalysts only and do not ordinarily become an essential part of the final polymer.

The manner in which the polymerization (also called curing) is preformed influences the physical properties of the final polymer. For example, a polymerization performed over an extended period of time will frequently give a soft, rubbery, sometimes tacky, product, while a more rapid polymerization will yield a hard brittle polymer. When applying a silicone coating to finely divided solid particles to render them free flowing and water repellent, a hard brittle coating is most desirable and a soft tacky coating is obviously unsuitable. Sometimes attempts are made to augment the catalyst action with heat but an elevated temperature frequently has a deleterious effect on the material being coated.

It is frequently desirable to have a silicone polymer containing additional functional atoms. To date, such compounds have been prepared by expensive, and sometimes difficult, reactions with the siloxane monomer.

It is an object of this invention to provide a siloxane polymer which can be applied extremely rapidly at atmospheric temperatures and pressure to solids, even when finely divided. It is a further object of this invention to provide a siloxane polymer cross linked with an organic nitrogen compound.

I have now found that when a partially hydrolyzed methyl hydrogen polysiloxane having a hydrogen to silicon ratio between about 0.9 and about 1.1 to 1 is reacted with an alkyl diamine, a substantial quantity of the diamine is retained in the final siloxane polymer. The reaction rate varies somewhat with the particular silicone and amine but is extremely rapid, even at room temperature, often producing a solid polymer in a matter of minutes. Water may be present during the reaction, but its presence does not appear to be essential.

Dow Corning 1107 is an example of a commercially available silicone fluid which is suitable for practice of this invention. It is described as a linear methyl polysiloxane of 50 to 60 units. Average molecular weight is 3000 to 5000. About nine-tenths of the silicon molecules have hydrogen attached. It is believed to have the following formula:

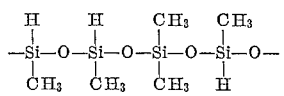

In reactions involving silicone 1107 the hydrogen atoms attached to the silicon atoms are hydrolyzed. A catalyst will promote the reaction, but there must be a compound containing active hydrogen present if the reaction is to take place. The active hydrogen can be supplied by water, alcohols or other organic compounds containing active hydrogen. Basic materials such as amines both catalyze the reaction and supply hydrogen. This reaction, however, is relatively slow. I have found that it is possible to effect a very rapid cure by reacting with the silicone (and presumably with crosslinking) an aliphatic compound having terminal primary amine groups such as ethylene diamine, diethylene triamine, triethylene tetramine and 1,6-diamino-n-hexane (hexamethylene diamine). When one of these amines is added to Dow Corning 1107 on a watch glass, the cure is so rapid that the hydrogen released during the reaction cannot escape and so give the produce a milky appearance.

The reaction appears to go in two steps, a very rapid first reaction in which a crosslinking occurs as the primary amine groups react with the silicone chain, and a second, slower reaction in which curing takes place due to the alkaline nature of the amine molecule with or without the help of the oxygen of the air, or possibly because of its dehydrating effect as pointed out by Rochow U.S. Patent No. 2,371,068.

There are many ways in which triethylene tetramine, for example, might combine with the siloxane in a copolymer molecule, one of which is shown:

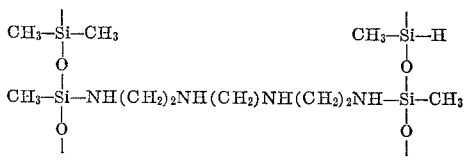

A molecule of hydrogen would then be released at each crosslinking site (one H atom from the amine and one from the silicone).

I believe this illustrates the initial rapid reaction and the remaining hydrogen atoms are released through curing in the usual fashion. The invention will be further illustrated, but not limited, by the following examples:

*Example 1*

Equal quantities of Dow Corning 1107 and triethylene tetramine were mixed on a watch glass. Almost immediately the sample began to give off heat and within a few minutes formed a milky white solid. After standing several days, the sample was ground up, washed several times with a 50/50 solution of methanol and water to remove all surplus amine and dried at 100° C. for about 24 hours. Analysis indicated the polymer contained 2.83% nitrogen which is equivalent to 7.4% triethylene tetramine.

*Example 2*

The example above was repeated except that three parts of silicone to one part of triethylene tetramine were used. The resulting product was worked up in the same way and analysis indicated nitrogen content of 1.18%.

Since the amount of nitrogen retained in the molecule appeared to vary directly with the amount of the amine initially present in the reaction mixture, although much less than the total amount of the amine present, it seemed that the crosslinking reaction involving the primary amine groups was limited by the rapid solidification of the product. This theory was supported by the following experiment.

*Example 3*

7.5 parts of Dow Corning 1107 silicone and 2.5 parts of triethylene tetramine were dissolved in 20 ml. of toluene, a solvent being employed so that there would be mobility of the reagents even after crosslinking of the product began.

The product was washed and dried as outlined in Example 1 and analysis indicated 2.2% nitrogen, corresponding to 5.73% triethylene tetramine. Crosslinking is believed to occur on the primary nitrogen sites of triethylene tetramine rather than the secondary nitrogen, especially in view of fact that dihexyl amine, which has only secondary linkage, apparently did not form a compound with the siloxane. This is illustrated in the following example:

*Example 4*

Nine parts of Dow Corning 1107 silicone were mixed with one part of di-n-hexylamine and placed on a watch glass. This solution cured noticeably slower (overnight) to give a clear glassy product which was worked up as in Example 1. An analysis indicated no nitrogen had been retained in the product.

Since only the primary amine group reacts with the siloxane, the secondary amine groups of the reagents in Examples 1 to 3 above are available for further reaction with other reagents if desired.

It is evident that my polymerization does not take place by dehydration as suggested by Rochow, since the amine reacts even when employed in water solution. However, the siloxane is insoluble in water and so the reaction takes longer because of the poorer contact.

*Example 5*

An emulsion was prepared from equal parts of Dow Corning 1107 and water containing a wetting agent. To nine parts of this emulsion was added one part of a solution containing equal parts of water and triethylene tetramine. A reaction occurred, although it appeared to be less vigorous than similar experiments without water. The resulting mixture cured over night on a watch glass to a rubbery translucent solid which later became hard and brittle. Other amines which will react in similar fashion are illustrated below.

*Example 6*

A sample of Dow Corning 1107 fluid was polymerized by adding approximately 1 part of 1,6-hexane diamine (hexamethylene diamine) to 9 parts of the silicone oil in mixing on a watch glass. There was evidence of immediate reaction and within three hours the sample had become hard. This was allowed to stand exposed to the atmosphere for a period of 6 months, after which it was ground and then washed with a mixture of methanol and water, and finally dried for 24 hours at 100° C. The sample was found to contain 0.34% nitrogen which corresponds to 1.4% hexane diamine.

*Example 7*

One part of N-methyl bis(aminopropyl) amine was added to 9 parts of Dow Corning 1107 fluid and mixed on a watch glass. There was immediate reaction, and within three hours the reaction product had solidified. This was allowed to stand exposed to the atmosphere for 6 months, at which time it was worked up as in Example 6 above. The polymer was analyzed and found to contain 0.93% nitrogen which corresponds to 3.3% N-methyl bis(aminopropyl) amine.

The polymer of this invention is especially useful when employed as a release agent or moisture-repellent coating on heat sensitive materials. To prevent sticking, a rubber gasket was treated as follows:

*Example 8*

The rather rough surface of a sheet of rubber was wiped with a cloth containing triethylene tetramine, the treatment being sufficient to leave a very thin film of the amine compound on the rubber. This was immediately followed by wiping with a cloth containing Dow Corning 1107. In a short time, the surface of the rubber which had been so treated acquired a slightly glossy look which greatly reduced the tendency of the rubber to adhere to a metal surface after the two had been held tightly together for a period of time.

The following examples will illustrate the method of applying a silicone coating crosslinked with triethylene tetramine to a powder of very small particle size.

*Example 9*

A 400 g. sample of commercial Disomate (analysis: 60.3% disodium methyl arsenate, 28.7% NaCl, 0.6% trivalent As) was coated with 2 g. (0.5%) Dow Corning 1107 in a jar mill. The sample was milled for 1 hour with a quantity of ½" porcelain balls; then a small portion was removed and mixed separately with about 0.4 g. triethylene tetramine. This portion was then returned to the mill and milled with the main batch for another 30 min. The sample was screened to remove the balls and was found to be very free flowing and water repellent.

*Example 10*

To 100 parts of a sodium bicarbonate having a mean particle size of 20 microns were added 0.5 part of Dow Corning 1107 fluid and this was agitated in a laboratory ball mill for one hour, after which 0.05 part of triethylene tetramine were added followed by further agitation in the ball mill for ½ hour. The sodium bicarbonate thus treated was free flowing and water repellent immediately, and these properties were enhanced to some degree by standing for one week.

The initial caking tendencies of sodium bicarbonate are the reason such a long time is required to mix the silicone with it. This period can be reduced by adding a small quantity of a flow-promoting agent such as tricalcium phosphate, or even a portion of the previous batch of silicone-coated sodium bicarbonate before the mixing is begun.

Sodium bicarbonate treated as in Example 10 above is entirely suitable for use as a dry chemical fire-extinguishing agent and has an advantage in that it is less abrasive than other dry chemical agents in which the silicone coating has been cured with high surface materials such as activated alumina or silica gel, either of which is quite abrasive and can cause wear on valves, nozzles and other similar fire extinguisher parts.

Sodium chloride, calcium carbonate and borax were also successfully coated by the procedure of Example 10.

As little as 0.2% by weight of the silicone polymer on a powder will render it free flowing and water repellent, although these properties are not as pronounced as when slightly larger quantities are used. When as much as about 1.5% of the silicone polymer is added to a finely divided powder, it becomes extremely water repellent but its free-flowing characteristics begin to diminish.

Changes and modifications may be made in the described details of the invention which are intended to be included within the scope of the appended claims.

I claim:

1. A nitrogen-containing silicone polymer consisting essentially of the product of the reaction between a partially hydrolyzed methyl hydrogen polysiloxane having between about 0.9 and about 1.1 hydrogen atoms per silicon atom and aliphatic amine having at least 2 terminal primary amine groups.

2. The method of applying a water-repellent nitrogen-containing silicone polymer coating to a solid object which comprises applying to the surface of said solid object a thin first layer of an aliphatic diamine selected from the group consisting of ethylene diamine, diethylene triamine, triethylene tetramine, hexamethylene diamine and N-methyl bis(aminopropyl) amine and then applying a second layer of a partially hydrolyzed methyl hydrogen polysiloxane having between about 0.9 and about 1.1 hydrogen atoms per silicon atom, both of said layers being applied at room temperature.

3. The nitrogen containing silicone polymer of claim 1 wherein the aliphatic amine is a member selected from the group consisting of ethylene diamine, diethylene triamine, triethylene tetramine, hexamethylene diamine and N-methyl bis(aminopropyl) amine.

4. The nitrogen containing silicone polymer of claim 1 wherein the partially hydrolyzed methyl hydrogen polysiloxane has a molecular weight of 3,000 to 5,000.

5. The method of applying a water-repellent nitrogen-containing silicone polymer coating to finely divided solids which comprises dispersing the finely divided solids into a partially hydrolyzed methyl hydrogen polysiloxane having between about 0.9 to about 1.1 hydrogen atoms per silicon atom and thereafter adding to the finely divided solids an aliphatic amine selected from the group consisting of ethylene diamine, diethylene triamine, triethylene tetramine, hexamethylene diamine and N-methyl bis(aminopropyl) amine.

6. The method of applying a nitrogen-coating silicone polymer coating to a solid object which comprises applying to the surface of said solid object at about room temperature a thin first layer of an aliphatic amine having at least two terminal primary amine groups and then applying a second layer of a partially hydrolyzed methyl hydrogen siloxane having between about 0.9 and about 1.1 hydrogen atoms per silicon atom, both of said layers being applied at room temperature.

7. A composition comprising finely divided solids having a nitrogen-containing silicone polymer coating which consists essentially of the product of reaction between a partially hydrolyzed methyl hydrogen polysiloxane having between about 0.9 and about 1.1 hydrogen atoms per silicon atom and aliphatic amine having at least two terminal amine groups.

8. The composition of claim 7 wherein the aliphatic amine is a member selected from the group consisting of ethylene diamine, diethylene triamine, triethylene tetramine, hexamethylene diamine and N-methyl bis(aminopropyl) amine.

9. The composition of claim 7 wherein the finely divided solids comprise alkali metal bicarbonate.

10. The composition of claim 7 wherein the hydrolyzed methyl hydrogen polysiloxane has a molecular weight of 3,000 to 5,000.

References Cited by the Examiner

UNITED STATES PATENTS

| | | | |
|---|---|---|---|
| 2,371,068 | 3/45 | Rochow | 260—46.5 |
| 2,588,393 | 3/52 | Kauppi | 260—46.5 |
| 2,788,280 | 4/57 | Rust | 117—100 |
| 2,789,956 | 4/57 | Eder | 117—161 |
| 2,976,185 | 3/61 | McBride | 117—138.86 |

WILLIAM D. MARTIN, *Primary Examiner.*

RICHARD D. NEVIUS, *Examiner.*